(12) United States Patent
Dai et al.

(10) Patent No.: US 12,478,957 B2
(45) Date of Patent: Nov. 25, 2025

(54) PREPARATION METHOD AND USE OF COBALT NANOPARTICLE/BORON NITRIDE COMPOSITE

(71) Applicant: China University of Petroleum (East China), Qingdao (CN)

(72) Inventors: Pengcheng Dai, Qingdao (CN); Yan Feng, Qingdao (CN); Yang Li, Qingdao (CN); Xuebo Zhao, Qingdao (CN); Dehong Yang, Qingdao (CN); Hongyu Gan, Qingdao (CN); Yubin Tian, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 420 days.

(21) Appl. No.: 18/147,243

(22) Filed: Dec. 28, 2022

(65) Prior Publication Data

US 2023/0264179 A1    Aug. 24, 2023

(30) Foreign Application Priority Data

Feb. 23, 2022   (CN) .......................... 202210168748.7

(51) Int. Cl.
 *B01J 23/80* (2006.01)
 *B01J 27/24* (2006.01)
 (Continued)

(52) U.S. Cl.
 CPC .............. *B01J 23/80* (2013.01); *B01J 27/24* (2013.01); *B01J 35/40* (2024.01); *B01J 35/51* (2024.01);
 (Continued)

(58) Field of Classification Search
 CPC ... B01J 23/80; B01J 27/24; B01J 35/51; B01J 37/009; B01J 37/0236; B01J 37/04;
 (Continued)

(56) References Cited

FOREIGN PATENT DOCUMENTS

| CN | 102976294 A | * | 3/2013 | |
|---|---|---|---|---|
| CN | 106881141 A | * | 6/2017 | ................ C02F 1/70 |

(Continued)

OTHER PUBLICATIONS

Hielscher, T. Ultrasonic Production of Nano-Size Dispersions and Emulsions, ENS 2005, 2005, Paris, France, 138-143, HAL Id: hal-00166996, 2007 (Year: 2007).*

(Continued)

*Primary Examiner* — Stefanie J Cohen
(74) *Attorney, Agent, or Firm* — MH2 Technology Law Group, LLP

(57) ABSTRACT

The present disclosure belongs to the technical field of sewage treatment, and relates to a preparation method and use of a cobalt nanoparticle/boron nitride composite. The preparation method includes the following steps: dissolving 2-methylimidazole and boric acid in deionized water, and stirring to obtain a solution A; dissolving $Co(NO_3)_2 \cdot 6H_2O$ and $Zn(NO_3)_3 \cdot 6H_2O$ in deionized water, and conducting ultrasonic dispersion to obtain a solution B; transferring the solution B into the solution A, and stirring to form a clear and transparent solution; transferring the clear and transparent solution into a container lined with Teflon, and conducting a reaction; subjecting an obtained product to cooling, filtration, washing, and drying sequentially to obtain a precursor of the composite; and conducting roasting on the precursor in an ammonia gas atmosphere to obtain the cobalt nanoparticle/boron nitride composite with a spherical superstructure.

4 Claims, 5 Drawing Sheets

(51) Int. Cl.
| | |
|---|---|
| *B01J 35/40* | (2024.01) |
| *B01J 35/51* | (2024.01) |
| *B01J 37/00* | (2006.01) |
| *B01J 37/02* | (2006.01) |
| *B01J 37/03* | (2006.01) |
| *B01J 37/04* | (2006.01) |
| *B01J 37/08* | (2006.01) |
| *B01J 37/34* | (2006.01) |
| *C02F 1/72* | (2023.01) |
| *C02F 101/30* | (2006.01) |
| *C02F 101/34* | (2006.01) |
| *C02F 101/38* | (2006.01) |

(52) U.S. Cl.
CPC ......... *B01J 37/009* (2013.01); *B01J 37/0236* (2013.01); *B01J 37/031* (2013.01); *B01J 37/04* (2013.01); *B01J 37/088* (2013.01); *B01J 37/343* (2013.01); *C02F 1/722* (2013.01); *C02F 1/725* (2013.01); *C02F 2101/308* (2013.01); *C02F 2101/345* (2013.01); *C02F 2101/38* (2013.01)

(58) Field of Classification Search
CPC ........ B01J 37/088; B01J 37/343; B01J 37/10; C02F 1/725; C02F 2101/38
See application file for complete search history.

(56) References Cited

FOREIGN PATENT DOCUMENTS

| | | | | |
|---|---|---|---|---|
| CN | 109734740 A | * | 5/2019 | |
| CN | 113058633 A | * | 7/2021 | ............ B01J 37/086 |
| CN | 110265670 B | * | 12/2021 | .......... H01M 4/8825 |

OTHER PUBLICATIONS

CN-106881141-A—English translation (Year: 2017).*
CN109734740A_English_Translation (Year: 2019).*
Cao, L.; et al., Spherical Superstructure of Boron Nitride Nanosheets Derived from Boron-Containing Metal-Organic Frameworks, JACS, 2020, 142, 8755-8762 and Supporting information (attached at end of article) (Year: 2020).*
CN110265670B_English_Translation (Year: 2021).*
CN-113058633-A—English translation (Year: 2021).*
CN102976294A_English_Translation (Year: 2023).*

* cited by examiner

PREPARATION METHOD AND USE OF COBALT NANOPARTICLE/BORON NITRIDE COMPOSITE This patent application claims the benefit and priority of Chinese Patent Application No. 202210168748.7, filed on Feb. 23, 2022, the disclosure of which is incorporated by reference herein in its entirety as part of the present application.

TECHNICAL FIELD

The present disclosure belongs to the technical field of sewage treatment, and relates to a preparation method and use of a cobalt nanoparticle/boron nitride composite with a spherical superstructure.

BACKGROUND

With the rapid development of modern industry and the further advancement of urbanization, a large number of pollutants enter groundwater, rivers, lakes, and oceans through different channels, making water pollution one of the major environmental problems facing China. Among various pollutants, organic pollutants such as pesticides, organic synthesis intermediates, endocrine disruptors, and antibiotics have become a difficult point in the treatment of water pollutants due to toxicity, low biodegradability, and persistence. The endocrine disruptors can interfere with the endocrine systems of human beings and animals, causing abnormal effects on the reproductive development, immune systems, and nervous systems of the human beings and animals, thereby increasing an incidence of cancerization in human reproductive organs as well as leading to hermaphroditism in some wild fish. In addition, a long-term discharge of low-dosage antibiotics into the environment may cause toxicity to organisms and increase a drug resistance of pathogenic microorganisms, such that an effective dosage of the antibiotics in killing pathogenic microorganisms continues to increase. Therefore, it is crucial to the sustainable development of nature and human beings by deep removal of the organic pollutants in water.

At present, the sewage is generally treated by biological methods, physical methods, and chemical oxidation methods and the like. These methods have a desirable treatment effect on organic pollutants with a high content in the sewage, but have a poor treatment effect on low-content and refractory organic pollutants such as the endocrine disruptors and antibiotics. Moreover, these methods are generally time-consuming and difficult to meet the requirements of advanced sewage treatment. Advanced oxidation processes (AOPs) are characterized by the generation of hydroxyl radicals with a strong oxidative capacity. Under high temperature and pressure, as well as electricity, illumination, and catalysts, the AOPs oxidize refractory organic matters into low-toxic or non-toxic small molecular substances, so as to remove pollutants in water efficiently and rapidly. Accordingly, AOPs are one of the treatment methods for refractory organic pollutants that attract great attention.

Compared with hydroxyl radicals (OH), sulfate radicals ($SO_4^-$) generated by peroxymonosulfate (PMS) activation have higher oxidizing properties, a longer half-life, and a stronger acid and alkali resistance. As a result, AOPs with the PMS as an oxidant has become a focus of current researches. Currently, the PMS are activated mainly by ultraviolet activation, thermal activation, alkali activation, carbon-based catalyst activation, and transition metal-based catalyst activation. The ultraviolet activation, thermal activation, and alkali activation each require huge energy and an extremely high cost, greatly limiting their widespread use in practice. A catalytic activity of carbon-based catalysts still lags far behind transition metal-based catalysts; and in the transition metal-based catalysts, transition metals such as iron, cobalt, manganese, copper, and nickel can activate the PMS through electron transfer. Studies have shown that cobalt is the best metal catalyst for persulfate activation. However, the common transition metal catalysts have poor transition metal dispersion, leading to a longer time for pollutant treatment, which generally takes tens of minutes to degrade the pollutants completely. In addition, the transition metal itself has easy aggregation and easy loss of particles, thereby making persulfate-activating catalysts based on the transition metals easy to deactivate due to a poor stability. In summary, the development of stable, efficient, and highly-dispersed transition metal-based catalysts has attracted the attention of many researchers.

SUMMARY

In order to overcome the shortcomings of the prior art, an objective of the present disclosure is to design and provide a preparation method and use of a cobalt nanoparticle/boron nitride composite with a spherical superstructure. The present disclosure is intended to avoid a long treatment time and a poor stability of transition metal-based catalytic materials in catalytic activation of a persulfate for degradation of a pollutant in water in the prior art.

The present disclosure provides a preparation method of a cobalt nanoparticle/boron nitride composite with a spherical superstructure, including the following steps:

S1, preparation of a solution A: dissolving 2-methylimidazole and boric acid at a molar ratio of (0.5-1):(1-2) in deionized water, and stirring for 15 min to obtain the solution A;

S2, preparation of a solution B: dissolving $Co(NO_3)_2 \cdot 6H_2O$ and $Zn(NO)_3 \cdot 6H_2O$ at a molar ratio of (0.5-1):(1-2) in deionized water, and conducting ultrasonic dispersion for 15 min to obtain the solution B;

S3, preparation of a precursor: transferring the solution B into the solution A, and stirring for 15 min to form a clear and transparent solution; transferring the clear and transparent solution into a container lined with Teflon, and conducting a reaction at 150° C. for 6 h to 18 h; subjecting an obtained product to cooling, filtration, washing, and drying sequentially to obtain the precursor of the composite; and S4, conducting roasting on the precursor obtained in step S3 at 800° C. to 1,200° C. for 2 h to 5 h in an ammonia gas atmosphere to obtain the cobalt nanoparticle/boron nitride composite with a spherical superstructure.

Preferably, in step S1, 10 mL to 20 mL of the deionized water is used for every 15 mmol of the 2-methylimidazole; and in step S2, 10 mL to 20 mL of the deionized water is used for every 2.6 mmol of the $Zn(NO_3)_2 \cdot 6H_2O$.

Preferably, in step S3, a method for the cooling, filtration, washing, and drying includes the following steps: cooling the clear and transparent solution to a room temperature, and conducting filtration to collect a solid product; washing the solid product 3 to 5 times with deionized water; and drying a washed solid product in an oven at 50° C. to 80° C. for 6 h to 12 h.

Preferably, in step S3, the container is a stainless steel autoclave lined with the Teflon.

The present disclosure further provides use of the cobalt nanoparticle/boron nitride composite with a spherical superstructure prepared by the preparation method in catalytic activation of a persulfate for degradation of an organic pollutant in water, including the following steps:
(1) adding the composite to sewage containing the organic pollutant and stirring for 10 min to 30 min to obtain mixed sewage, where the organic pollutant and the composite have a mass concentration ratio of 1:(4-10); and
(2) adding the persulfate to the mixed sewage, and conducting a reaction by stirring at 10° C. to 40° C. for 1 min to 30 min to degrade the organic pollutant in the sewage, where the composite and the persulfate have a mass concentration ratio of 1:(15-30).

Preferably, the sewage has a pH value of 3 to 11.

Preferably, the organic pollutant is one or a combination of two or more selected from the group consisting of 2-chlorophenol, 3-chlorophenol, 4-chlorophenol, bisphenol A, atrazine, and rhodamine B.

Preferably, the persulfate is a peroxymonosulfate, preferably potassium peroxymonosulfate.

Compared with the prior art, the present disclosure has the following beneficial effects:
(1) In the cobalt nanoparticle/boron nitride composite, cobalt nanoparticles are uniformly dispersed on a boron nitride nanosheet, and a surface of each cobalt nanoparticle is covered with a thin layer of the boron nitride. This avoids aggregation and loss of the cobalt nanoparticles during AOPs, thereby ensuring a stability of the cobalt nanoparticle/boron nitride composite as a catalyst in the reaction, with a high recycling rate.
(2) The cobalt nanoparticle/boron nitride composite is a three-dimensional material with a spherical superstructure and formed by free growth and assembly of a large number of the boron nitride nanosheets coated with the cobalt nanoparticles, and the sewage containing organic pollutants can quickly enter and exit the cobalt nanoparticle/boron nitride composite along gaps formed by the nanosheets, providing a huge contact area and a rapid reaction pathway for the cobalt nanoparticles with reactants in water.
(3) The cobalt nanoparticle/boron nitride composite can degrade 98% of organic pollutants such as 2-chlorophenol, 3-chlorophenol, 4-chlorophenol, bisphenol A, atrazine, and rhodamine B within 1 min, and can achieve 99.9% degradation of the organic pollutants within 10 min.
(4) The cobalt nanoparticle/boron nitride composite has a simple preparation process and desirable stability, and is suitable for an AOP of refractory organic pollutants in water. The composite also has a desirable free radical generation speed, a high persulfate utilization rate, a long catalyst service life, and no need of other treatment equipment. The preparation method has a low one-time investment cost, a reduced operating cost, a simple and easy operation, and an extremely broad prospect for use.

DETAILED DESCRIPTION OF THE EMBODIMENTS

To make the objectives, technical solutions, and advantages of the present disclosure clearer, the present disclosure is further described below with reference to the accompanying drawings and specific examples. Understandably, the specific embodiments described herein are merely intended to explain the present disclosure but not to limit the present disclosure.

It should be noted that experimental methods used in the following examples are conventional methods unless otherwise specified; materials, reagents, and equipment used in the following examples can be obtained from commercial sources unless otherwise specified.

Example 1

A preparation method of a cobalt nanoparticle/boron nitride composite with a spherical superstructure included the following steps:
S1, preparation of a solution A: 15 mmol of 2-methylimidazole and 45 mmol of boric acid were dissolved in 15 ml of deionized water, and stirred for 15 min to obtain the solution A;
S2, preparation of a solution B: 2.6 mmol of $Zn(NO_3)_2 \cdot 6H_2O$ and 1.0 mmol of $Co(NO_3)_3 \cdot 6H_2O$ were dissolved in 15 ml of deionized water, and ultrasonic dispersion was conducted for 15 min to obtain the solution B;
S3, preparation of a precursor: the solution B was transferred into the solution A, and stirred for 15 min to form a clear and transparent solution; the clear and transparent solution was transferred into a stainless steel autoclave lined with Teflon, and a reaction was conducted at 150° C. for 12 h; an obtained product was cooled to a room temperature, and a solid product was collected by filtration; the solid product was washed 3 times with deionized water; and a washed solid product was dried in an oven at 60° C. for 8 h to obtain the precursor of the composite; and
S4, roasting was conducted on the precursor obtained in step S3 at 1,000° C. for 3 h in an ammonia gas atmosphere to obtain the cobalt nanoparticle/boron nitride composite.

Figure 1:
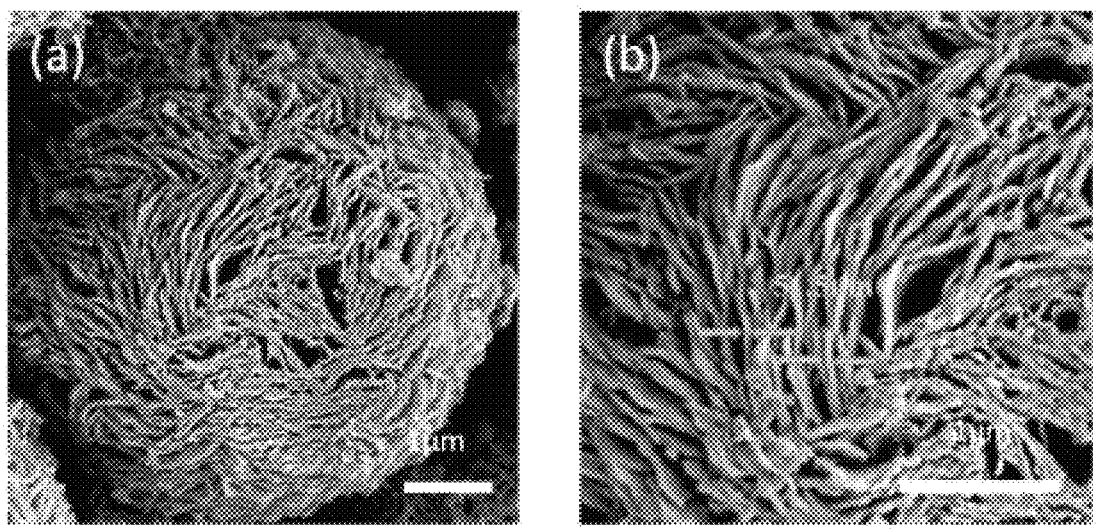
FIGS. 1A-B show scanning electron microscopy (SEM) images of a cobalt nanoparticle/boron nitride composite prepared in Example 1 of the present disclosure, where (b) is an enlarged image of (a)

FIGS. 1A-B show SEM images of the cobalt nanoparticle/boron nitride composite. It was seen from FIGS. 1A-B that the cobalt nanoparticle/boron nitride composite was a spherical nano-superstructure formed by tightly stacking nanosheets; a spherical shell structure had a diameter of 3 μm to 6 μm, the nanosheets had a thickness of about 60 nm, and there were irregular gaps between the nanosheets.

Figure 2:
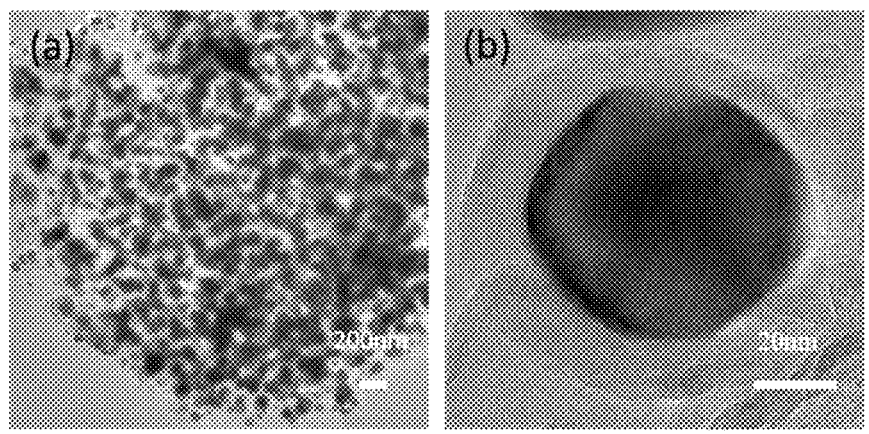
FIGS. 2A-B show transmission electron microscope (TEM) images of the cobalt nanoparticle/boron nitride composite prepared in Example 1 of the present disclosure, where (b) is an enlarged image of (a)

FIGS. 2A-B show a TEM images of the cobalt nanoparticle/boron nitride composite. It was seen from FIGS. 2A-B that cobalt nanoparticles were uniformly dispersed on the boron nitride nanosheets; and the cobalt nanoparticle had a particle size of 63 nm to 71 nm, and was covered with a thin layer of boron nitride in a thickness of 3 nm to 18 nm on a surface.

Example 2

Figure 3:
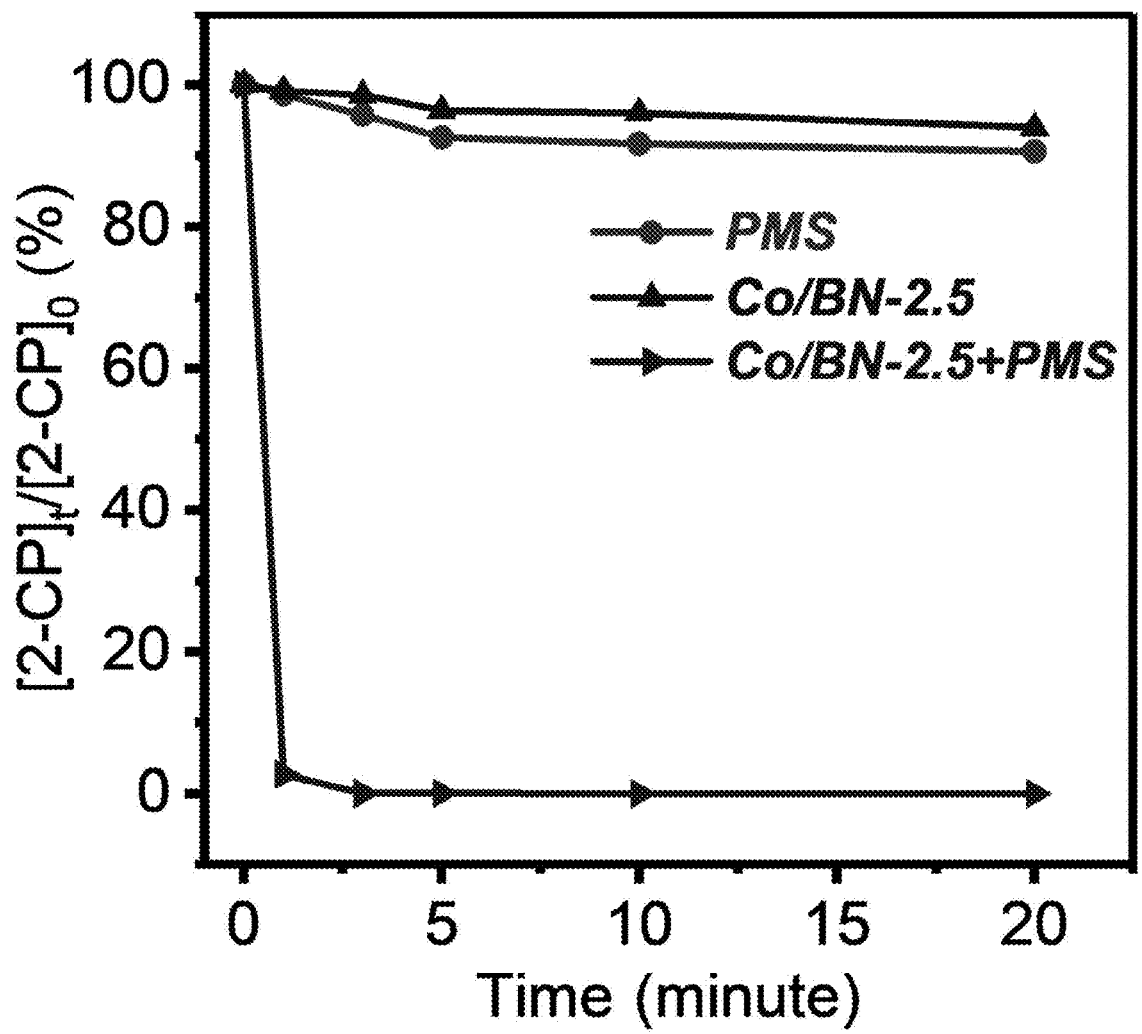
FIG. 3 shows removal efficiency result data of 2-chlorophenol in different additive systems in Example 2 of the present disclosure.

The cobalt nanoparticle/boron nitride composite prepared in Example 1 was used to treat an organic pollutant 2-chlorophenol in simulated sewage, and a specific process included the following steps:
a sewage system containing 2-chlorophenol of 0.8 mmol·L$^{-1}$ was adjusted to an initial pH value of 6.4 with sulfuric acid and a sodium hydroxide solution, and 10 ml of the sewage was added in three different containers separately; the three containers were numbered as a container 1, a container 2, and a container 3, respectively, and 5 mg of the cobalt nanoparticle/boron nitride composite was added to the container 2 and the container 3 separately and stirred to conduct adsorption for 20 min; 0.123 g of potassium peroxymonosulfate was added to the container 1 and the container 3 separately, and a reaction was conducted for 20 min at 30° C. and 300 rpm; samples were collected periodically to detect a removal efficiency of the 2-chlorophenol, and results were shown in FIG. 3. It was seen from FIG. 3 that: (1) after adding the potassium peroxymonosulfate alone for 10 min in the sewage system, the concentration of 2-chlorophenol did not decrease significantly, indicating that only adding the peroxymonosulfate could not completely remove 2-chlorophenol in the sewage system; (2) after adding the cobalt nanoparticle/boron nitride composite alone in the sewage system for 10 min, the concentration of 2-chlorophenol did not decrease significantly, indicating that only adding the cobalt nanoparticle/boron nitride composite could not completely remove 2-chlorophenol in the sewage system; and (3) after adding the cobalt nanoparticle/boron nitride composite and the potassium peroxymonosulfate simultaneously for 1 min, the 2-chlorophenol was degraded by 98%, and the 2-chlorophenol in the sewage system was almost completely degraded after 10 min, indicating that the cobalt nanoparticle/boron nitride composite could effectively activate the peroxymonosulfate to degrade 2-chlorophenol.

Example 3

Figure 4:
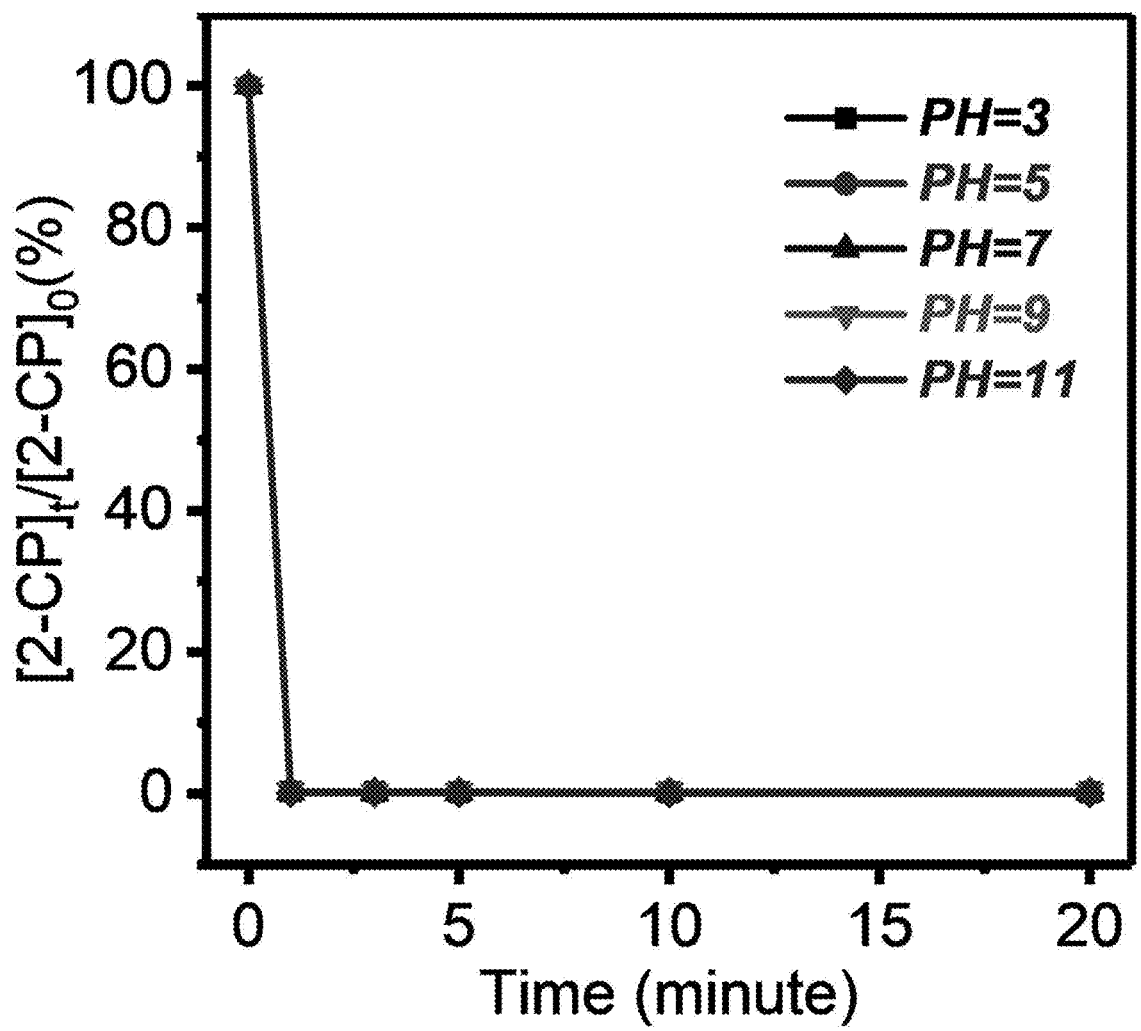
FIG. 4 shows removal efficiency result data of the 2-chlorophenol in different pH values in Example 3 of the present disclosure.

The cobalt nanoparticle/boron nitride composite prepared in Example 1 was used to treat an organic pollutant 2-chlorophenol in simulated sewage with different pH values, and a specific process included the following steps:
10 ml of a sewage system containing 2-chlorophenol of 0.8 mmol·L$^{-1}$ was placed in five different containers separately, the sewage containing 2-chlorophenol in the five containers were adjusted to an initial pH value of 3, 5, 7, 9, and 11 with sulfuric acid and a sodium hydroxide solution, respectively, and the five containers were numbered accordingly; 5 mg of the cobalt nanoparticle/boron nitride composite was added to each container, 0.123 g of potassium peroxymonosulfate was added to each container after stirring to conduct absorption for 20 min, and a reaction was conducted at 30° C. and 300 rpm for 20 min; a removal efficiency of the 2-chlorophenol was detected by sampling regularly, and results were shown in FIG. 4. It was seen that at a pH value of 3 to 11, adding the cobalt nanoparticle/boron nitride composite and the peroxymonosulfate into the sewage system each had a desirable degradation performance of the 2-chlorophenol.

Example 4

Figure 5:
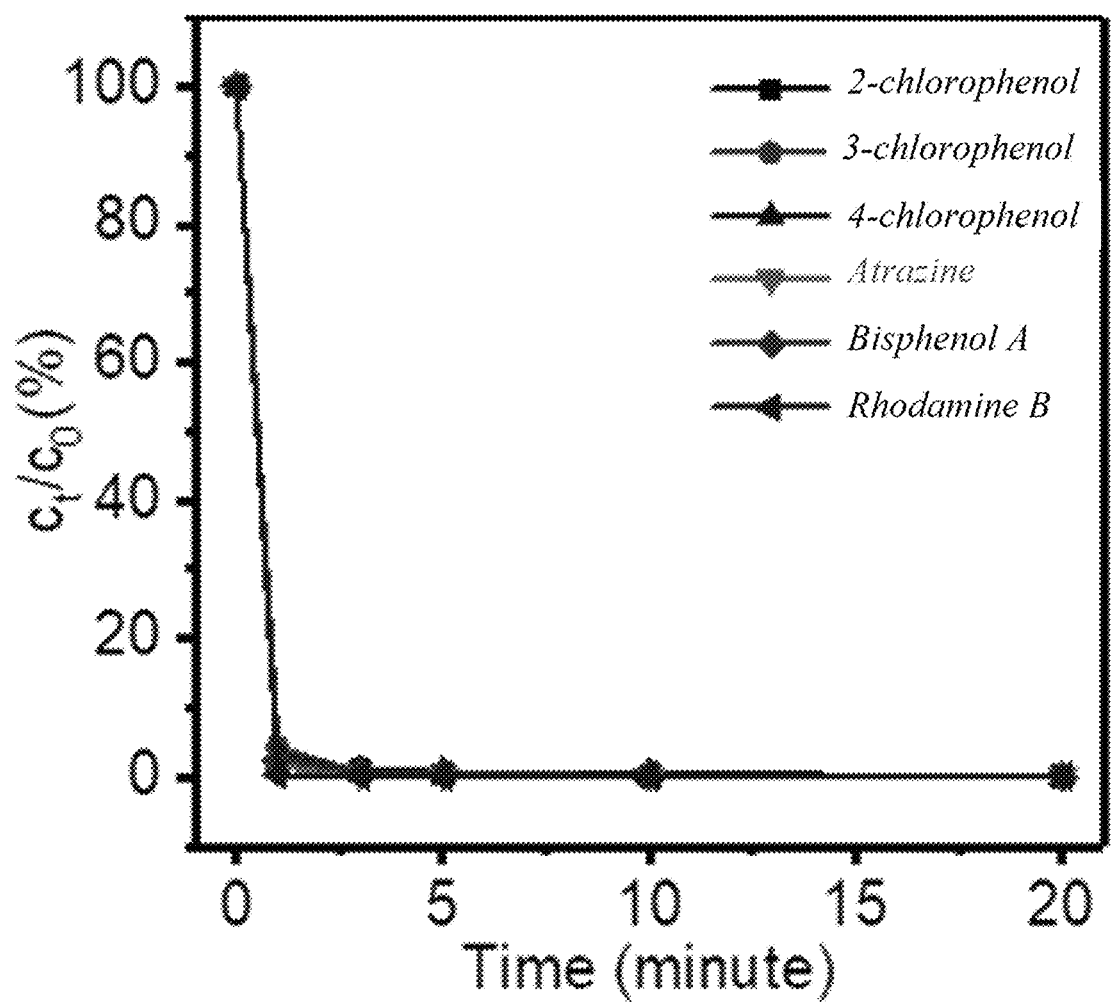
FIG. 5 shows result data of a composite in Example 4 of the present disclosure in treating different organic substances.

The cobalt nanoparticle/boron nitride composite prepared in Example 1 was applied to sewage systems of different organic pollutants: 10 ml of sewage containing 0.8 mmol·L$^{-1}$ of 2-chlorophenol, 3-chlorophenol, 4-chlorophenol, bisphenol A, atrazine, and rhodamine B were placed in six different containers, respectively, correspondingly numbered, and the sewage in the six containers were adjusted to an initial pH value of 6.4 with sulfuric acid and a sodium hydroxide solution separately; 5 mg of the cobalt nanoparticle/boron nitride composite was added to each container, 0.123 g of potassium peroxymonosulfate was added to each container after stirring to conduct absorption for 20 min, and a reaction was conducted at 30° C. and 300 rpm for 20 min; a removal efficiency of each organic pollutant was detected by sampling regularly, and results were shown in FIG. 5. It was seen that in sewage systems of different organic pollutants, adding the cobalt nanoparticle/boron nitride composite and the peroxymonosulfate each had a desirable degradation performance of the organic pollutants.

Example 5

Figure 6:
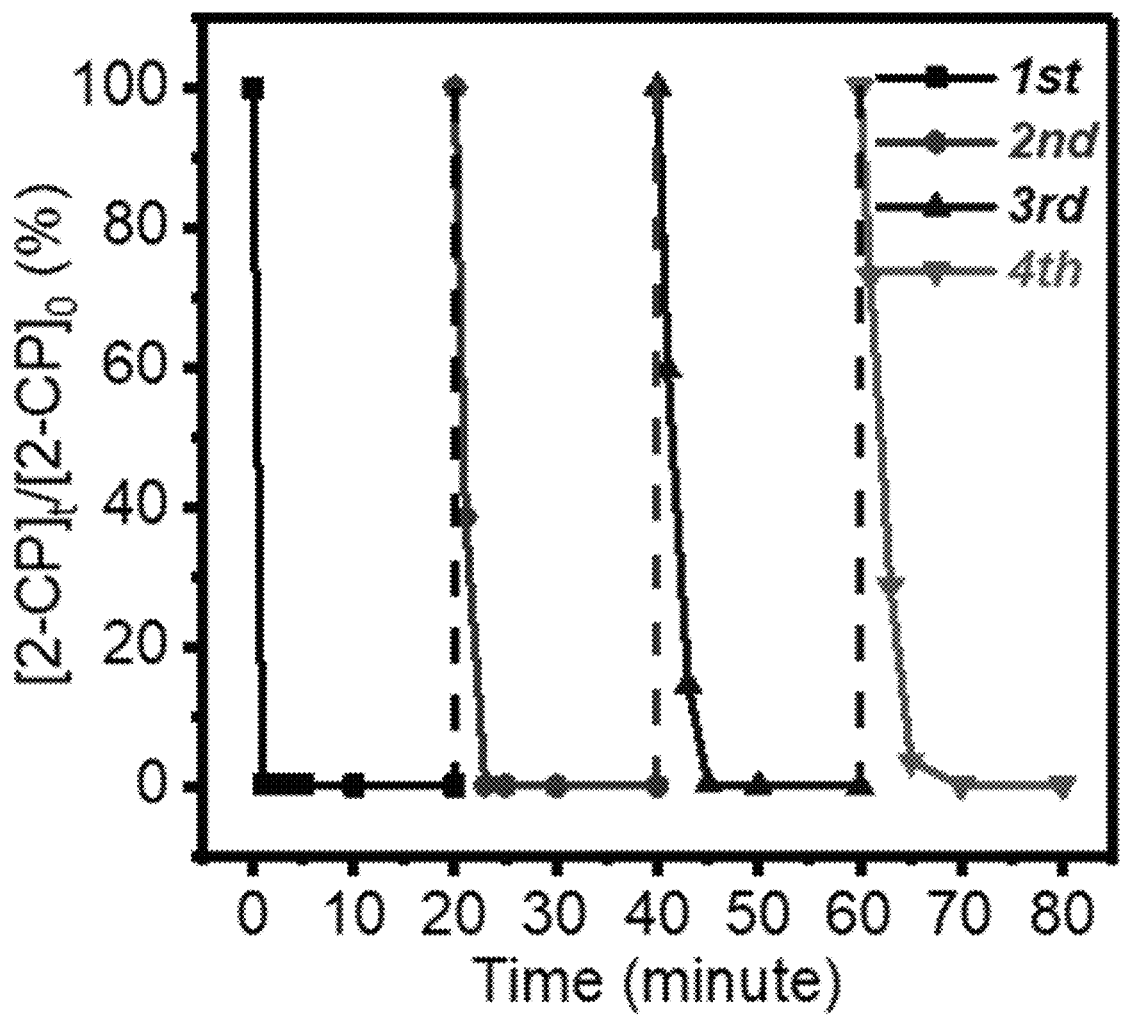
FIG. 6 shows result data of continuous treatment of the 2-chlorophenol with a composite in Example 5 of the present disclosure.

The cobalt nanoparticle/boron nitride composite prepared in Example 1 was used to continuously treat 2-chlorophenol: 10 ml of a sewage system containing 2-chlorophenol of 0.8 mmol·L$^{-1}$ was placed in five different containers separately, the sewage containing 2-chlorophenol in the five containers were adjusted to an initial pH value of 6.4 with sulfuric acid and a sodium hydroxide solution; 5 mg of the cobalt nanoparticle/boron nitride composite was added to each container, 0.123 g of potassium peroxymonosulfate was added to each container after stirring to conduct absorption for 20 min, and a reaction was conducted at 30° C. and 300 rpm for 20 min; a removal efficiency of the organic pollutant was detected by sampling regularly; after the reaction, the catalyst was recovered by filtration and drying, and the above operations were repeated to obtain result data shown in FIG. 6. It was seen from FIG. 6 that the cobalt nanoparticle/boron nitride composite had a desirable catalytic activity, meeting requirements of a process parameter design by repeated experiments for 4 consecutive times; and a degradation rate of the 2-chlorophenol in sewage could reach 99.9% within 10 min.

In summary, the cobalt nanoparticle/boron nitride composite with a spherical superstructure achieves rapid degradation of organic pollutants, and can degrade 98% of the organic pollutants such as 2-chlorophenol, 3-chlorophenol, 4-chlorophenol, bisphenol A, atrazine, and rhodamine B within 1 min, and can achieve 99.9% degradation of the organic pollutants within 10 min; in addition, the cobalt nanoparticle/boron nitride composite with a spherical superstructure has a wider pH range in degrading organic matters efficiently; meanwhile, the cobalt nanoparticle/boron nitride composite with a spherical superstructure can also achieve rapid and effective degradation of pollutants in the presence of different types of inorganic anions.

Finally, it should be noted that the examples above are merely intended to explain, rather than to limit, the technical solutions of the present disclosure. Although the present disclosure is described in detail with reference to the preferred examples, those of ordinary skill in the art should understand that modifications or equivalent substitutions may be made to the technical solutions of the present disclosure without departing from the spirit and scope of the technical solutions of the present disclosure, and these modifications or equivalent substitutions shall fall within the scope of the claims of the present disclosure.

What is claimed is:

1. A preparation method of a cobalt nanoparticle/boron nitride composite, comprising the following steps:
   S1, preparation of a solution A: dissolving 2-methylimidazole and boric acid at a molar ratio of (0.5-1):(1-2) in deionized water, and stirring for 15 min to obtain the solution A;
   S2, preparation of a solution B: dissolving $Co(NO_3)_2 \cdot 6H_2O$ and $Zn(NO_3)_3 \cdot 6H_2O$ at a molar ratio of (0.5-1):(1-2) in deionized water, and conducting ultrasonic dispersion for 15 min to obtain the solution B;
   S3, preparation of a precursor: transferring the solution B into the solution A, and stirring for 15 min to form a clear and transparent solution; transferring the clear and transparent solution into a container lined with Teflon, and conducting a reaction at 150° C. for 6 h to 18 h; subjecting an obtained product to cooling, filtration, washing, and drying sequentially to obtain the precursor of the cobalt nanoparticle/boron nitride composite; and
   S4, conducting roasting on the precursor obtained in step S3 at 800° C. to 1,200° C. for 2 h to 5 h in an ammonia gas atmosphere to obtain the cobalt nanoparticle/boron nitride composite with a spherical superstructure.

2. The preparation method of the cobalt nanoparticle/boron nitride composite according to claim 1, wherein in step S1, 10 mL to 20 mL of the deionized water is used for every 15 mmol of the 2-methylimidazole, and wherein in step S2, 10 mL to 20 mL of the deionized water is used for every 2.6 mmol of the $Zn(NO_3)_2 \cdot 6H_2O$.

3. The preparation method of the cobalt nanoparticle/boron nitride composite according to claim 1, wherein in step S3, the cooling, filtration, washing, and drying specifically comprises: cooling the clear and transparent solution to room temperature, and conducting filtration to collect a solid product; washing the solid product 3 to 5 times with deionized water; and drying a resulting washed solid product in an oven at 50° C. to 80° C. for 6 h to 12 h.

4. The preparation method of the cobalt nanoparticle/boron nitride composite according to claim 1, wherein in step S3, the container is a stainless steel autoclave lined with the Teflon.

* * * * *